Oct. 1, 1929.  K. LANDSMANN  1,729,618
ALTERNATING CURRENT MOTOR
Filed March 17, 1927
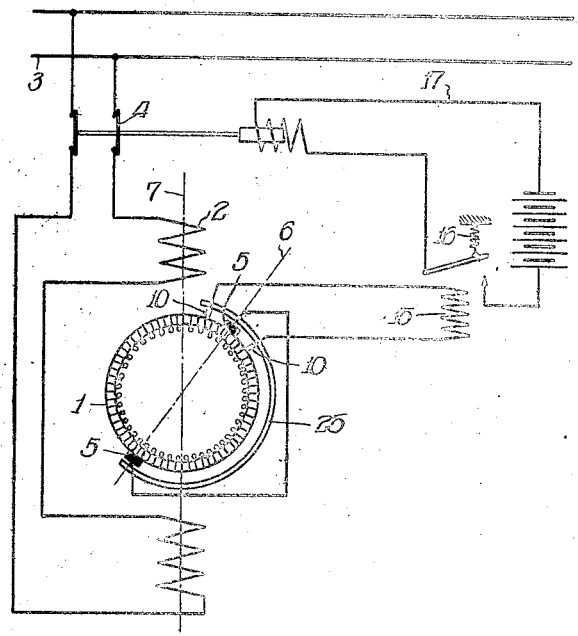
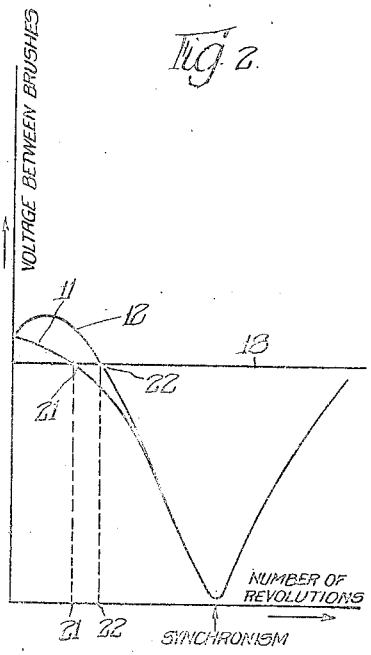
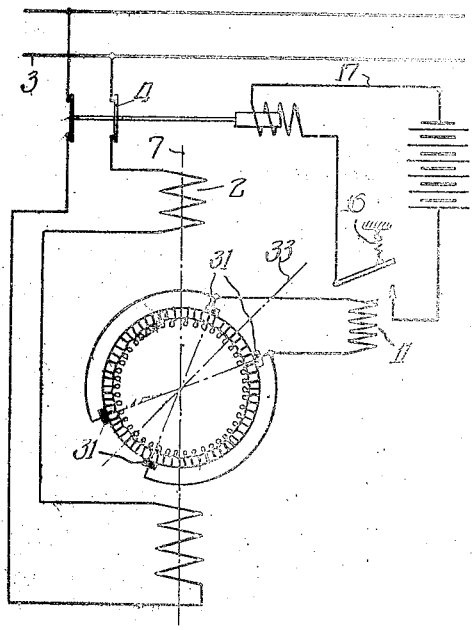
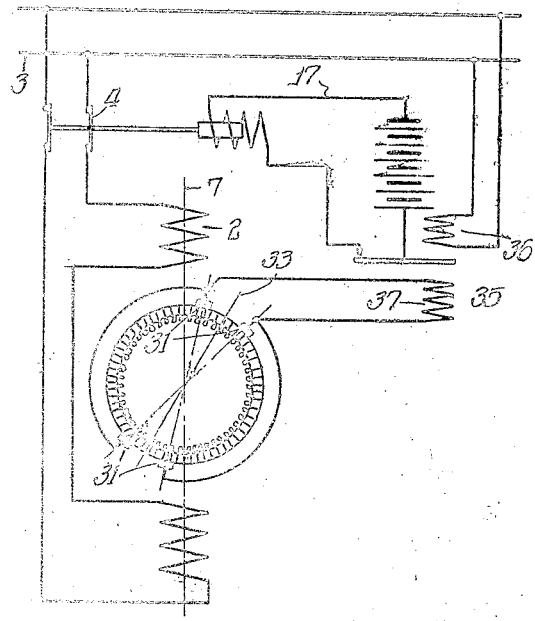
Inventor:
Kurt Landsmann,
by Cromwell, Greist & Warden
attys.

Patented Oct. 1, 1929

1,729,618

UNITED STATES PATENT OFFICE

KURT LANDSMANN, OF MANNHEIM, GERMANY, ASSIGNOR TO AKTIENGESELLSCHAFT BROWN BOVERI & CIE., OF BADEN, SWITZERLAND, A JOINT-STOCK COMPANY OF SWITZERLAND

ALTERNATING-CURRENT MOTOR

Application filed March 17, 1927, Serial No. 176,239, and in Germany March 22, 1926.

My invention relates to alternating-current commutator machines, and has particular relation to commutator-type motors provided with automatic protective means for cutting out the motors under predetermined operating conditions.

The speed of alternating-current commutating motors, such as repulsion motors, is often controlled by adjustment of the positions of the brushes cooperating with the commutator. This adjustment is usually effected by shifting the brushes on the commutator. In most cases it is, however, important that the brushes shall not be brought into the no-torque position of the motor without also disconnecting the motor from the supply line or introducing a suitable current limiting resistor. This is particularly the case in connection with repulsion motors or other motors having similar characteristics. If such motor is left connected to the line with the brushes in or near the no-torque position, the armature windings are practically short-circuited by the brushes and will be traversed by very heavy currents, quickly overheating and damaging the motor.

In the following specification I shall designate the position of the brushes at which they practically short-circuit the armature as the zero position of the brushes.

According to the invention, in order to protect the motor against overcurrents and excessive heating by reason of shifting the brushes into or near the zero position, use is made of the fact that the voltage between certain portions of the commutator depends on the position of the brushes thereon. To this end, an auxiliary relay or switching device is so actuated in response to the variation of the voltage difference between said portions of the commutator as to cause the motor to be de-energized when the brushes are in a position at which excessive current would tend to flow into the motor and armature.

The invention will be best understood by the following description of an exemplification of the invention, reference being made to the accompanying drawings wherein, Fig. 1 is a diagrammatic view of one form of the invention;

Fig. 2 is a curve diagram illustrating the variation of the voltage between certain portions on a commutator in response to the variations of the speed of the motor; and Figs. 3 and 4 are views similar to Fig. 1 illustrating other forms of my invention.

I shall describe the invention as applied to a repulsion motor although in its broad aspects it is not restricted thereto. As shown in Fig. 1, the motor comprises a commutator-type armature 1 cooperating with a stationary field member having field windings 2 that are connected to an alternating supply line 3 by means of an electromagnetically actuated switch 4. A pair of short-circuited brushes 5 bear on the commutator and are disposed on an axis 6 inclined to the axis 7 of the field member. As is known, the speed of the repulsion motor depends on the relative inclination of the brush axis 6 with respect to the field axis. If the two axes are in coincidence, no-torque will be exercised between the armature and the field member, and the motor will be at a standstill. Under such conditions, and assuming that switch 4 remains closed, the armature winding will act like a short-circuited secondary transformer winding with respect to the field windings 2, causing excessive current flow into the field winding and the armature, with consequent overheating of and damage to the motor.

The present invention safeguards the motor against such overheating in case the brushes are brought into, or near, the zero or no-torque position at which the motor is at a standstill or rotates at a dangerously low speed. In carrying out the invention, use is made of the fact that the voltage distribution along the commutator directly depends on the operating condition of the machine. If auxiliary brushes 10 are placed equal distances to the right and left of the brush axis 6, as shown in Fig. 1, and the voltage between said auxiliary brushes plotted against the motor speed, curves as shown in Fig. 2 will be obtained. Curve 11 represents the no-load conditions and curve 12 represents the full load conditions. Similar curves are obtained with motors having several sets of brushes. In the case of motors with one set of brushes, the brush axis with respect to which the auxiliary brushes 10 are located is the line connecting the two brushes of opposite polarity. In the case of motors have two brush sets, the brush axis is the line connecting the mid-points between the brush pairs of opposite polarity.

According to the invention, this characteristic variation of the voltage depending on the speed or brush position of the machine is utilized to control the energization of the machine in order to avoid overheating and damage thereto as a consequence of improper relationship between the brush and field axes. To this end, the two auxiliary brushes 10 may, for instance, serve to control the opening of the motor energizing switch 4, as by means of a relay 15 which is normally held open by means of a spring 16 but which closes a tripping circuit 17 of the switch 4 when the voltage applied to the relay exceeds a predetermined value, for instance, that given by the horizontal line 18 in Fig. 2. With this arrangement the motor remains connected to the line as long as the position of the main brushes 5 is such that the voltage between the auxiliary brushes 10 is less than the predetermined value as fixed by line 18, corresponding to definite minimum motor speeds 21, 22 for the unloaded and loaded motor, respectively, and minimum speeds intermediate said value in case of a partially loaded motor.

By the choice of the positions of the auxiliary brushes 10 on both sides of the brush axis, the voltage between the said brushes reaches the tripping value at a speed which is higher for the loaded motor than for the unloaded motor. This is very advantageous since the loaded motor draws a larger current from the line, and accordingly, it is important that it be disconnected in a more advanced brush position than the unloaded motor. The auxiliary brushes are arranged to be moved in unison with the main brushes 5, as by means of a rocker ring 25.

By suitable choice of the voltage at which the relay responds, it is thus possible to definitely cut out the motor or otherwise reduce the current thereto whenever the brushes are brought into a position at which dangerous overheating would occur.

When starting the motor the voltage between the auxiliary brushes will ordinarily, for a short instance, exceed the tripping value of the relay 15. In order to prevent inopportune tripping under such conditions, the relay 15 is preferably made to act with a time delay that is somewhat greater than the normal starting period of the motor. It is, of course, important that this time delay should not be too long and that the relay shall operate before the motor is capable of reaching a dangerous condition. Relays having a time delay action depending on the voltage are preferred for this purpose.

As will be seen from Fig. 2, the voltage between the auxiliary brushes 10 is a minimum for synchronous speed and rises again when the motor speed is increased above synchronism. At high speed the voltage between the auxiliary brushes again reaches a value at which the relay 15 would cause tripping of the circuit. Accordingly, the above described protective system automatically protects the motor against overspeeding.

The invention is not restricted to the type of motor shown in Fig. 1 but is generally applicable to all motors wherein similar voltage conditions obtain. In Fig. 3 is shown a repulsion motor having two main pairs of brushes 31 that have fixed relationship with respect to each other and that are shifted in common in order to regulate the speed. Accordingly, the brushes of the same polarity are always disposed the same distance to the right and left of the brush axis 33 which leads through the mid-point between the two brushes. One pair of such brushes can, therefore, be directly utilized to operate the tripping relay 11 of the protective system. The voltage which is thus applied to the relay shows the same characteristic variations as the voltage derived from the auxiliary brushes 10 of Fig. 1.

In the preferred modification of the invention shown in Fig. 4, the relay control brushes 31 are connected to a relay 35 which, in distinction from the relay shown in Figs. 1 and 3, is held open not by a spring but by a special voltage coil 36 acting oppositely to the coil 37 that is energized from the brushes. The coil 36 is energized in accordance with the line voltage and the force exercised thereby will, accordingly, be greater or less depending on the variations of said voltage. As a result, the voltage required to close the relay and establish the tripping circuit 17 of the line switch 4 will decrease in proportion with the decrease of the line voltage. By this arrangement the protective action will be obtained irrespective of the variation of the line voltage. That is, should the line voltage drop, say to a value at which the motor would stall owing to the loss of torque, a much smaller voltage between the relay control brushes 31 will be sufficient to cause tripping of the circuit breaker than when the motor has full voltage applied thereto.

I claim as my invention:

1. In an alternating-current commutator motor, an alternating-current supply line, means providing an operating field for said motor, switch means for providing an operative connection between said line and said field means, an armature having a commutator, brushes engaging said commutator and supported in fixed spaced relation with respect to each other and for angular adjusting movement with respect to said commutator, certain of said brushes being short-circuited, and means responsive to the voltage between certain of said brushes and being operable at a predetermined value of such voltage to effect opening action of said switch means.

2. In an alternating-current commutator motor, an alternating-current supply line, means providing an operating field for said motor, switch means for providing an operative connection between said line and said field means, an armature having a commutator, brushes engaging said commutator and supported in fixed spaced relation with respect to each other and for angular adjusting movement with respect to said commutator, certain of said brushes being short-circuited, and means responsive to the relation between the line voltage and the voltage between certain of said brushes and being operable at a predetermined value of such relation to effect opening action of said switch means.

3. In an alternating-current commutator motor, an alternating-current supply line, means providing an operating field for said motor, switch means for providing an operative connection between said line and said field means, an armature having a commutator, brushes engaging said commutator and supported in fixed spaced relation with respect to each other and for angular adjusting movement with respect to said commutator, certain of said brushes being short-circuited, and means responsive to the relation between the line voltage and the voltage between certain of said brushes and being operable at a predetermined value of said brush voltage over and above said line voltage to effect opening action of said switch means.

4. In an alternating-current commutator motor, an alternating-current supply line, means providing an operating field for said motor, switch means for providing an operative connection between said line and said field means, an armature having a commutator, brushes engaging said commutator and supported in fixed spaced relation with respect to each other and for angular adjusting movement with respect to said commutator, certain of said brushes being short-circuited, and means responsive to the voltage between certain of said brushes and being operable at a predetermined value of such voltage to effect opening action of said switch means; said last-named means including relay mechanism, and coils having opposing operating influence on such mechanism, one of said coils being responsive to line voltage and being operable to influence said mechanism against operation, another of said coils being responsive to the voltage between certain of said brushes and being operable to influence said mechanism into operating action.

In testimony whereof I have hereunto subscribed my name at Berlin on the 4th day of March, A. D. 1927.

KURT LANDSMANN.